Nov. 22, 1927. Re. 16,786

F. WAGNER

WATER PURIFYING SYSTEM FOR LOCOMOTIVES

Original Filed Feb. 17, 1921 4 Sheets-Sheet 1

Inventor
Fritz Wagner
By his Attorneys
Dean, Fairbank, Albright & Hirsch

Nov. 22, 1927.

Re. 16,786

F. WAGNER

WATER PURIFYING SYSTEM FOR LOCOMOTIVES

Original Filed Feb. 17. 1921 4 Sheets-Sheet 2

Inventor

Fritz Wagner

By his Attorneys

Dean Fountain Wright & Hirsch

Nov. 22, 1927.

Re. 16,786

F. WAGNER

WATER PURIFYING SYSTEM FOR LOCOMOTIVES

Original Filed Feb. 17, 1921

4 Sheets-Sheet 3

Inventor

Fritz Wagner

By his Attorneys

Dean, Fairbank, Wright & Hinch

Nov. 22, 1927. Re. 16,786

F. WAGNER

WATER PURIFYING SYSTEM FOR LOCOMOTIVES

Original Filed Feb. 17, 1921 4 Sheets-Sheet 4

Inventor

Fritz Wagner

By his Attorneys

Dean Fairbank Albright & Hirsch

Reissued Nov. 22, 1927. Re. 16,786

UNITED STATES PATENT OFFICE.

FRITZ WAGNER, OF BERLIN-LICHTERFELDE, GERMANY.

WATER-PURIFYING SYSTEM FOR LOCOMOTIVES.

Original No. 1,474,218, dated November 13, 1923, Serial No. 445,857, filed February 17, 1921, and in Germany May 27, 1914. Application for reissue filed November 3, 1925. Serial No. 66,636.

With few exceptions, feed water contains dissolved solids and gases which are undesirable as the solids form scale and the gases corrode the boiler plate. The problem of purifying or softening the feed water by eliminating such constituents has been solved by water-purifying plants in connection with stationary boilers but it involves difficulties in nonstationary boiler plants and particularly locomotive boilers where the space is limited and a purifier of the size required for efficient operation cannot be arranged.

It is an object of my invention to overcome these drawbacks and, with this object in view, I provide a purifying plant inside the boiler and preferably in a separate dome which is connected with the steam space of the boiler, and I inject the feed water into this dome where it mixes with the steam and partly condenses the steam so that it is thoroughly heated when it arrives in the water space of the boiler.

In a preferred embodiment of my invention, the feed water is preheated before being injected into said dome.

My invention includes an arrangement for heating the feed water in a counter-current with exhaust steam from the engine, and, if such be not available, from the feed pump or other auxiliaries. The invention also includes an arrangement for continually discharging the gases from the purifiers as well as means for depositing the sediment and for periodically removing the latter from the purifying plant. Finally, the invention relates to a method of extending the intervals between the cleaning operations without reducing the efficiency of the plant.

Figure 1:
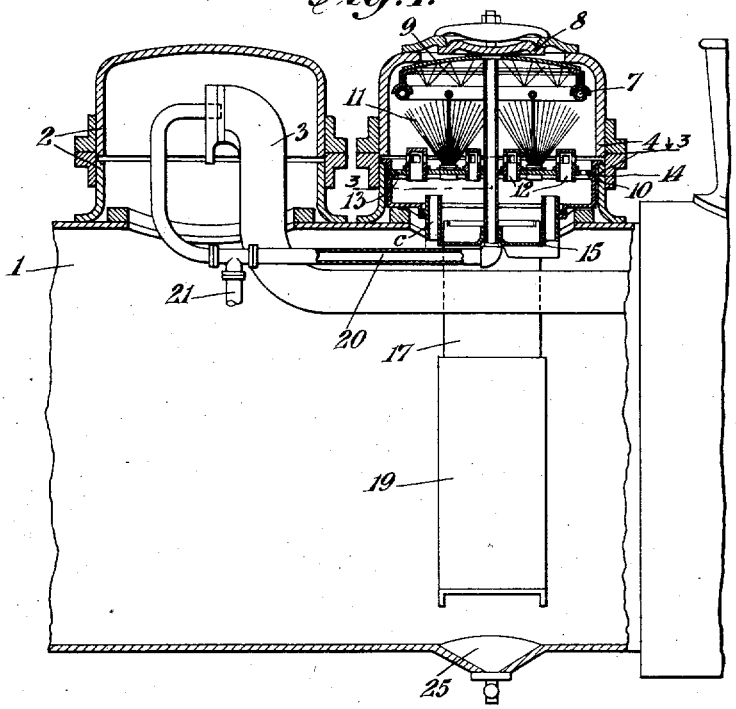
Figure 3:
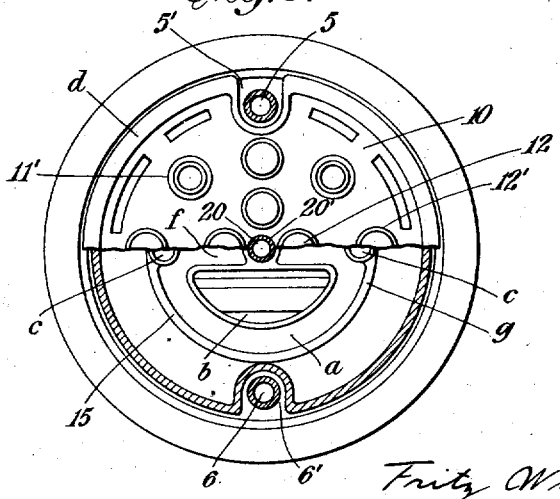
Figure 2:
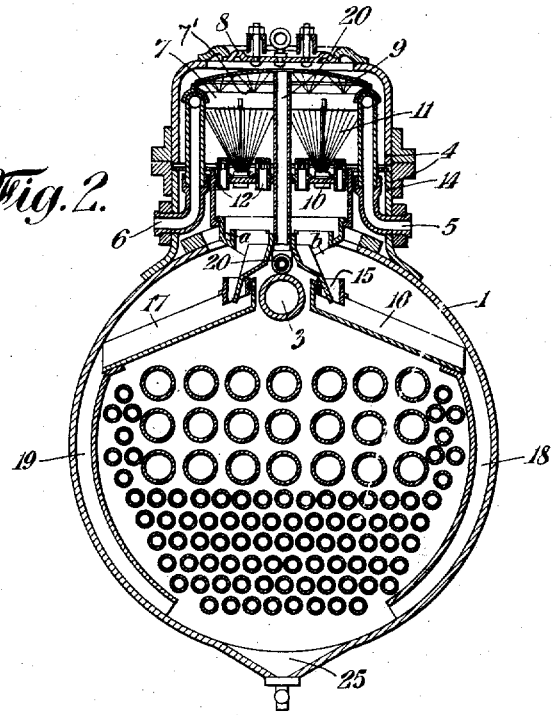
Figure 4:
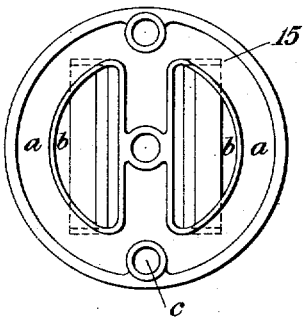
Figure 7:
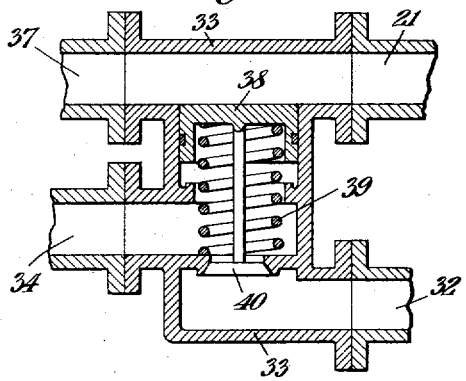
Figure 5:
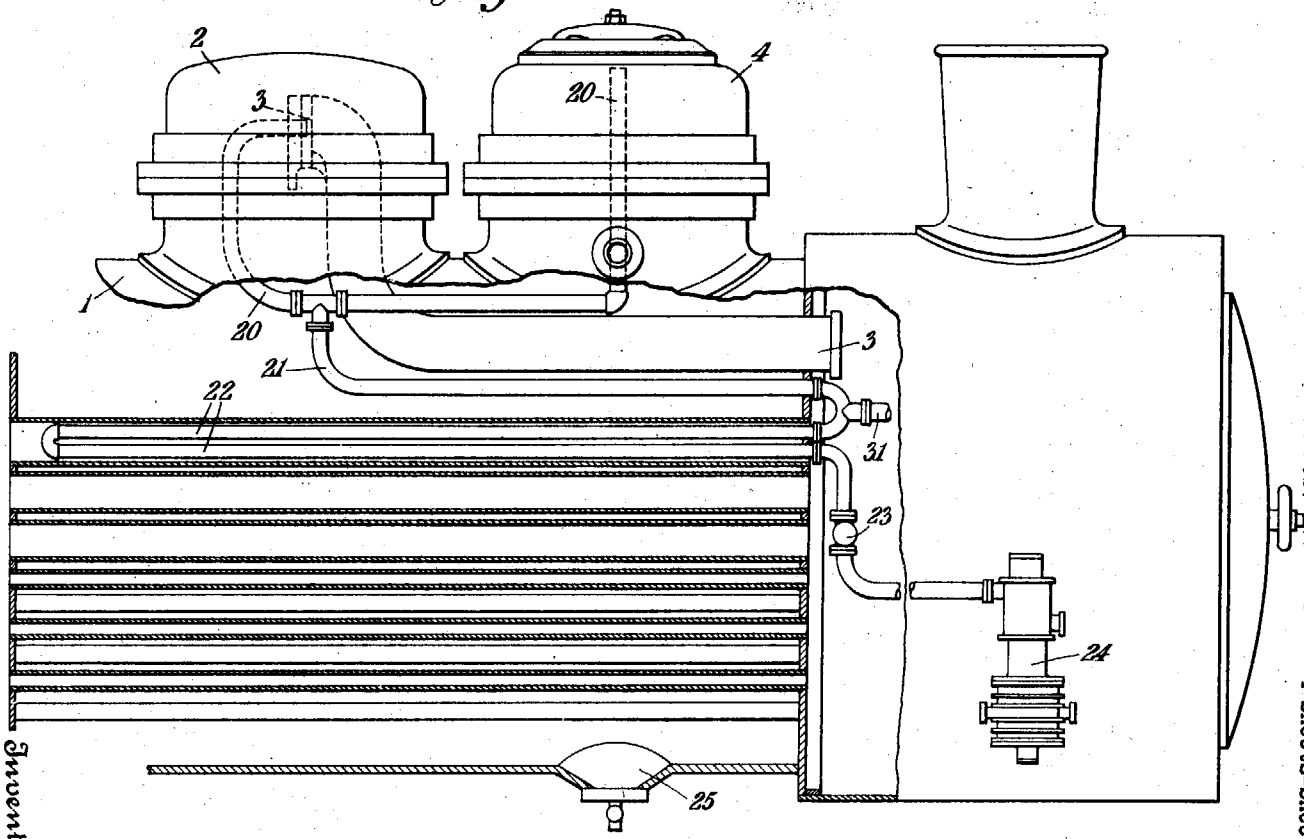
Figure 6:
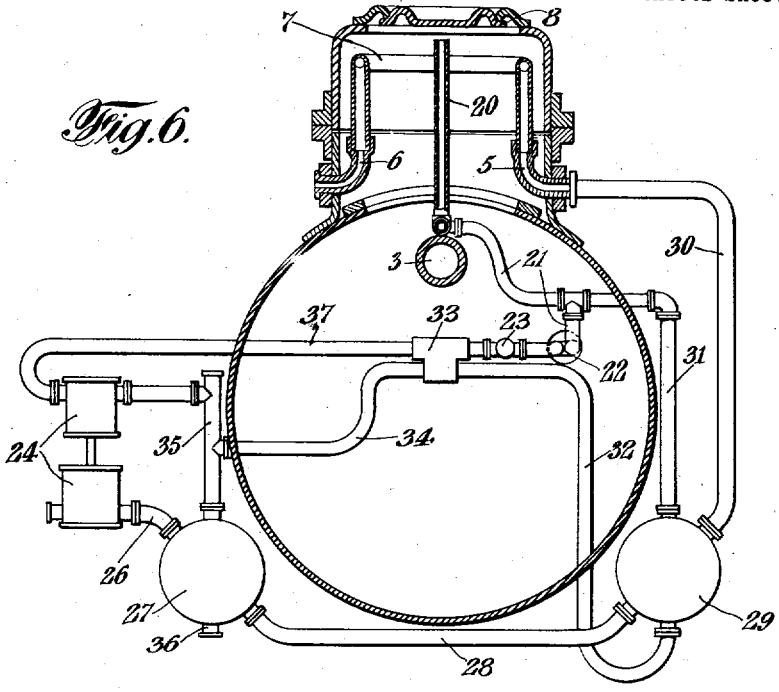
Figure 8:
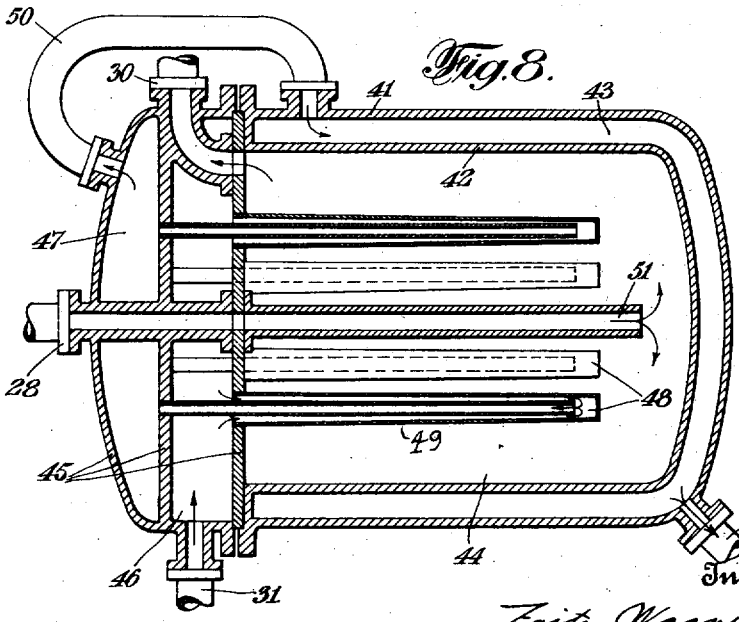

In the accompanying drawings:

Figs. 1 and 2 represent longitudinal and transverse sections through a locomotive-boiler and the purifying plant, Fig. 3 is a plan view of a water collecting tank in the purifier dome, partly in section on line 3—3 of Fig. 1, Fig. 4 is a plan view of a dish inserted at the bottom of said collecting tank, Fig. 5 is a side elevation of certain of the piping, Fig. 6 is a transverse section showing an arrangement for fractional separation, certain parts being omitted, Fig. 7 is a detail of a valve, and Fig. 8 is a diagram of a purifier.

As shown in Fig. 1, the locomotive-boiler 1 is provided with two steam-domes. The steam for driving the locomotive is taken from the rear dome 2 through the inlet pipe 3, while the feed water is softened in the front dome 4. The two vertical pipes 5 and 6 (Fig. 2) provided in the front dome 4, are the delivery pipes of an injector, not shown, and of the feed pump 24, respectively. Both pipes are connected with an annular pipe 7 from which the water is discharged in series of jets 7′ toward the cover of the dome. The cap of the dome is provided with a manhole, closed by the cover 8 pressed by the steam against its seat. Below the cover of the man hole there is secured in the dome a piece 9 of wire-gauze or other reticulated material.

A collecting tank 14 for the feed water and the condensate is arranged in the base of the dome and supported on its edge by a top flange *d*. A plate 10 is secured in the tank 14 below its top flange *d*, and brushes 11 of steel wire and short steam pipes 12 are inserted in holes 11′ and 12′ of the plate. Concentric slots 13 extend along the edge of the plate 10. A central hole 20′ is provided for a vertical steam pipe 20 which will be described below. Recesses 5′ and 6′ are formed in the wall of the tank 14 for the pipes 5 and 6, respectively.

The bottom *e* of the tank 14 is cut away at the centre and a dish *f* which may be of cast iron, is inserted in the central hole and supported by a flange *g*. Steam pipes *c*, *c* and water outlets *b*, the latter of substantially crescent shaped section, are formed in, or inserted in, the bottom of the dish which is preferably inclined toward the centre. The upper ends of the pipes *c* and the outlets *b* are at some distance above the bottom of the dish so that a water space is formed thereon from which the water trickles down along the walls of the outlets *b* and does not interfere with the steam ascending in said outlets and pipes *c*. Chutes 15 are arranged below the outlets *b*. Each chute 15, as will appear from Fig. 4, has portions projecting into two troughs 16 and 17, the open lower ends of which deliver into the conduits 18 and 19. These are formed by the boiler wall and bent sheets of metal riveted to the wall. These conduits project to points near the bottom of the boiler. A pipe 20 has a vertical portion centrally disposed in the dome and a connecting portion which projects into the open end of the inlet pipe 3 or near thereto. A branch pipe 21 of this pipe 20 is connected with one end of a superheater element 22, as shown in Fig. 5, while the other end of this element is connected with the steam feed pump 24 controlled by the stop-valve 23.

The plant works as follows:

The steam from the boiler fills the dome 4, passing through the openings *b* and the pipes *c* of the element 15 and through the pipes 12 and the slots 13 of the plate 10. When the throttle is opened—the throttle may be arranged in any convenient position, for instance, in the smoke box—steam passing from the rear dome 2 through the inlet pipe 3, produces a strong suction-action upon the pipe 20. By this means, the steam is introduced from the upper part of the front dome 4 into the inlet pipe 3, thereby producing a strong current of steam, which passes from the boiler into the dome 4. This current of steam through the dome 4 is increased, if the various appliances on the locomotive and which use steam, as for instance the steam feed-pump 24 also take steam from the dome 4. The current of steam passing through the dome 4 not only heats the dome itself thoroughly but also heats the feed water to such a degree that obnoxious reduction of temperature in the boiler water is prevented. The water, so fed, is discharged from the openings of the annular pipe 7 against the inner wall of the cover of the dome and the wire gauze below the cover of the dome. By this means, the water is converted into spray. This spray drops through the rising fresh steam towards the boiler so as to come into intimate contact therewith. As the interchange of heat between the steam and the sprays becomes the more perfect, the longer this intimate contact between both is maintained, provision had to be made for retarding the spray on its way to the boiler. For this purpose, the wire brushes 11 have been provided. The spray drops from the brushes 11 on to the plate 10 heated by the steam, and flows on the upper side to the periphery, to there drop through the slots 13. It then strikes against the bottom of tank 14 where it is partly subdivided by splashing, and is finally delivered to the chutes 15 and the troughs 16 and 17, and flows from the conduits 16 and 17 through the conduits 18 and 19 along the barrel wall towards the bottom of the boiler.

By this means, the dome 4 is permanently flooded by a current of live steam, so that, on entering the dome, the water continuously flows through pipes and falls through spaces, the temperature of which remains nearly the same as that of the boiler steam. The fall of the spray is retarded on its way from the top of the dome into the boiler by the brushes 11, plate 10 and the tank and the chutes 14 and 15, which have the temperature of the boiler steam. These obstacles maintain the spray and vary the direction of flow. Thus, the water comes into intimate contact for a relatively long time, with the heat-carriers. Consequently, the water is quickly heated to the temperature required for the separation of the matters in solution, while the solid substances have sufficient time to deposit on the obstacles (brushes, plate, etc.). The few solid residues in the water are finally deposited in the sump 25. To attain this, the two conduits 18 and 19 are arranged symmetrically in respect to the axis of the boiler in such a manner that the two currents of water leaving them, meet each other from opposite directions, and their speed is suddenly reduced so that the sediments have time to sink into the sump, before the feed water participates in the flow of the water contained in the boiler.

The gases separated from the water are carried off with the steam passing to the cylinders since the separation takes place in the annular pipe 7 or immediately after the water has left the said pipe.

The steam taken from the front dome 4, is, of course, highly aqueous. If now, this steam is to be used for operating feed and air pumps, it should be previously dried. Consequently the pipe 21 is connected with one end of a superheater element 22 (Fig. 5) while the other end is connected with the feed pump 24 across the stop-valve 23.

Large quantities of sediment cannot be retained in the dome, so that the dome must from time to time be cleaned. To attain this in a convenient manner, the cap of the dome 4 is provided with a manhole closed by a cover 8, pressed by the steam against its seat. (Figs. 1 and 2.) The wire gauze 9 and the plate 10 are composed of single parts which are of such size that they can be removed from the manhole. For the same purpose the maximum diameter of the brushes 11 is smaller than the minimum diameter of the manhole.

It is obvious that, besides the removal of the sediment in this way, the plant should from time to time be thoroughly cleaned. For this purpose, the cap of the dome 4 must be removed which requires considerable time and causes great inconveniences to the service. All measures allowing of extending the intervals between the operations are therefore highly valuable for the service.

As is well known, sediment consists of different kinds of salts, each kind of salt having a special temperature for separation. Some salts are separated if the heat exceeds 100° C., while others require more than 140° C.

This characteristic feature of the sediment has been utilized in my system to extend the intervals between the operations. The method employed for this purpose consists in heating the feed water in purifiers divided by fractions, said fractions being so connected with each other that the purifier of the lower fraction is always heated with the exhaust-steam from the purifier of the higher fraction. The exhaust-steam from the purifier of the lowest fraction is conveyed to the feed-water preheater heated by the exhaust-steam of the locomotive.

By means of this gradual heating method of the feed-water part of the sediment is deposited in the purifier of the lowest fraction. The remainder of the sediment, which is conveyed to the purifier of the higher fraction, is then deposited in this purifier and so on. By this means, the space for depositing the sediments is essentially larger, as compared with the arrangement according to Figs. 1 and 2. For this reason, the intervals between the operations may be extended, without impairing the efficiency of the plant.

Fig. 6 shows a diagrammatic view of the method of purifying the feed water divided into fractions. The front dome 4 is likewise provided with the devices shown in Figs. 1 and 2, though they are not shown in Fig. 6. Between the dome 4 and the preheater 27 a purifier 29 is provided at a convenient point of the locomotive. These three apparatus are so connected with each other that the water forced by the feed-pump 24 into the preheater 27 through the pipe 26 passes through the pipe 28, the purifier 29, pipe 30 and pipe 5 into the front dome 4, in which it is finally softened in the usual manner. A branch-pipe 31, connected through the branch-pipe 21 to the pipe 20, leads into the purifier 29. The purifier 29 is connected with the pipe 35 by means of the pipe 32 and valve 33 and the pipe 34. Through the pipe 35 the exhaust steam of the locomotive passes into the preheater 27. Besides, one side of the valve 33 is connected with the stop-valve 23 and the latter with the superheater element 22, while its other side is connected with the water-pump 24 by means of the pipe 37. The exhaust steam of the water pump 24 leads into the pipe 35. The preheater 27 is connected with the atmosphere by means of the pipe 36. The object of the valve 33 is to maintain the communication between the pipes 32 and 34 as long as the feed pump 24 is in operation and to interrupt the communication when the pump is shut off.

Fig. 7 shows one form of execution of the valve 33. If the stop-valve 23 is opened so that the pump begins to work, the steam passing into the pump will force the piston 38 in the valve casing 33 downwards, thereby opening the spring pressed valve plate 40, so that the pipes 32 and 34 are in communication with each other. Consequently, the steam passes from the front dome 4 through the pipes 20, 21, and 31 into the purifier 29, thence through the pipe 32, the valve 33 and the pipes 34 and 35 into the preheater 27, from which it passes as condensed water into the open air through the pipe 36. Thus, the currents of steam and water again act according to the counter-current principle. By closing the valve 23 the valve-plate 40 is closed under the action of the spring 39, thereby interrupting the passage of steam from the front dome 4 to the atmosphere. By this means, each water feeding process produces automatically the counter-current of the steam necessary for heating the water, and, as soon as the feeding process ceases the counter-current of steam is also interrupted.

Fig. 8 shows one form of the fraction-purifier.

The purifier consists of two cylindrical vessels 41 and 42, the walls of which form chambers 43 and 44. The chamber 44 is closed by the cover 45, which is provided with three walls forming the chambers 46 and 47. The steam passes from the front dome 4 through the pipe 31 into the chamber 46, thence through the pipes 48 and 49 into the chamber 47. The chamber 47 is connected with chamber 43 by means of the pipe 50. The chamber 43 is connected with the chamber 46 in the cover of the purifier of the lower fraction, or, if no such purifier exists, with the valve 33 by means of the pipe 32 and so on. The feed water passes from the preheater 27 through the pipe 28, which is connected with the pipe 51, into the chamber 44 of the purifier and thence through the pipe 30 into the front dome 4.

The drawings show only an example for the arrangement and construction of the water purifying system, and I do not restrict myself to this form of construction. For example, only one fraction purifier 29 is shown in Fig. 6 between the feed water preheater 27 and the front dome 4. It is clear that, instead of one such purifier, several purifiers may be connected in series. Furthermore, it is clear that one fraction purifier may be arranged in the smoke box of the locomotive. In this case it is heated by the combustion gases of the locomotive. Thus, the connection between this purifier and the preheater and the dome is limited to the water supply.

Having now particularly described and ascertained the nature of my said invention, and in what manner the same is to be performed, I declare that what I claim is:

1. A steam boiler having a dome mounted thereon and in open communication at the lower end thereof with the interior of the boiler for the admission of live steam, means for delivering feed water to the upper portion of said dome, and a metallic brush within said dome and within the path of the descending feed water and serving to insure intimate contact between the counter-currents of feed water and steam and to afford surfaces for the deposit of sediment released from the water.

2. A steam boiler having a dome mounted thereon and in open communication at the lower end thereof with the interior of the boiler for the admission of live steam, means for delivering feed water to the upper portion of said dome, and a metallic brush within said dome and within the path of the descending feed water and serving to insure intimate contact between the counter-currents of feed water and steam and to afford surfaces for the deposit of sediment released from the water, and means for withdrawing steam from the upper portion of the dome above the point of delivery of the feed water.

3. A steam boiler having a dome mounted thereon and in open communication at the lower end thereof with the interior of the boiler for the admission of live steam, a transversely disposed, reticulated plate in the upper portion of said dome, means for spraying feed water upwardly against said plate, and means for withdrawing steam from said dome at a point above said plate.

4. A steam boiler having a dome mounted thereon and in open communication at the lower end thereof with the interior of the boiler for the admission of live steam, a transversely disposed wire gauze in the upper portion of said dome, means for spraying feed water upwardly against said gauze, and means for withdrawing steam from said dome at a point above said wire gauze.

5. A steam boiler having a dome mounted thereon and in open communication at the lower end thereof with the interior of the boiler for the admission of live steam, a transversely disposed wire gauze spaced below the top of the dome, means for delivering water to said gauze and means for withdrawing steam from the dome at a point above said gauze.

6. A steam boiler having a dome mounted thereon and in open communication at the lower end thereof with the interior of the boiler for the admission of live steam, a conical wire brush projecting upwardly within said dome, means for spraying water into the upper portion of said dome and permitting the spray to fall on to said brush.

7. A steam boiler having a dome mounted thereon and in open communication at the lower end thereof with the interior of the boiler for the admission of live steam, a plate mounted within said dome and having pipes for the passage of steam upwardly therethrough, a wire brush supported by said plate and extending upwardly therefrom, and means for delivering feed water to said brush.

8. A steam boiler having a dome mounted thereon and in open communication at the lower end thereof with the interior of the boiler for the admission of live steam, a plate mounted within said dome and having pipes for the passage of steam upwardly therethrough, a wire brush supported by said plate and extending upwardly therefrom, and means for spraying feed water into the upper portion of said dome and permitting it to fall by gravity onto said brush.

9. A steam boiler having a dome including two superposed tubular sections joined together, a transverse plate supported at the joint between said sections, and having vertical pipes for the upflow of steam, and apertures for the downflow of water, means for delivering water to the upper portion of the dome, and means for withdrawing steam from the upper portion.

10. A steam boiler having a dome including two superposed tubular sections joined together, a transverse plate supported at the joint between said sections, and having vertical pipes for the upflow of steam and apertures for the downflow of water, means for delivering water to the upper portion of the dome, means for withdrawing steam from the upper portion, and a plurality of brushes supported by said transverse plate and in the path of movement of the ascending steam and descending water.

11. A steam boiler having a dome, a transverse partition plate therein having pipes extending therethrough for the upflow of steam and apertures for the downflow of water, means for withdrawing steam from the upper portion of the dome, means for delivering feed water to said upper portion, a tank disposed beneath said plate and having an aperture therethrough for the downflow of water, and a chute for distributing the water flowing down through the aperture in said tank.

12. A steam boiler having a dome, means for delivering feed water to the upper end thereof, means for withdrawing steam from the upper end thereof, said dome having its lower end in open communication with the interior of the boiler, a transverse member adjacent to the lower end of the dome and having a brush for receiving and collecting the water descending in the dome, and a pair of transverse chutes for delivering water from said transverse member to the opposite sides of the boiler.

13. A construction as defined in claim 12, in which there are provided conduits extending from the ends of said chutes to the lower portion of the boiler.

14. A steam boiler having a dome, means for delivering feed water to the upper portion thereof, the lower end of the dome being open to receive live steam from the boiler, a pair of of oppositely disposed downwardly inclined chutes within the boiler for receiving the water flowing from said dome, and a pair of conduits formed of bent metal sheets attached to the inner surface of the boiler and extending downwardly along opposite sides thereof for conducting water from said chutes to the lower portion of the boiler.

15. A locomotive boiler embodying therein a barrel portion, a dome-shaped member arranged on the upper part of the barrel, said barrel having an opening surrounded by said dome-shaped member, the wall defining said opening having its upper edge adjacent to the lower end of said dome, a final feed water heater arranged within the dome-shaped member and having communication with the steam space of the boiler barrel through said opening, means for causing a movement of steam within said dome, in combination with a feed water preheater arranged outside of said dome, and means for conveying heated water from said preheater to the upper portion of said final feed water heater, thereby delivering to said final feed water heater feed water of a temperature adapted for final treatment to separate solids therefrom, said final feed water heater including means for subdividing the water delivered from said preheater and retarding its downflow and said opening permitting upflow of steam in a direction counter to that of the movement of said water and in contact with the latter within said dome.

16. A locomotive boiler embodying therein a barrel portion, a dome-shaped member arranged on the upper part of the barrel, said barrel having an opening of relatively large size surrounded by said dome-shaped member, the wall defining said opening having its upper edge adjacent to the lower end of said dome, a feed water heater arranged within the dome-shaped member and having communication with the steam space of the boiler barrel through said opening, in combination with a feed water preheater arranged outside of said dome, and means for conveying heated water from said preheater to the upper portion of said dome, thereby delivering to said first mentioned feed water heater feed water of a temperature adapted for final treatment in the said first mentioned feed water heater, said first mentioned feed water heater including means for subdividing the water delivered from said preheater and retarding its flow in a direction counter to that of the movement of said steam within said dome, the upward flow of steam in contact with the water in said dome being induced by condensation resulting from the action of the feed water.

17. A steam boiler comprising two steam domes, both open to the steam space of the boiler, a final feed water heater in one of said domes, a feed water preheater outside of said dome, means for supplying heated water from said preheater to said final feed water heater in said first mentioned dome, means for withdrawing steam from said other dome, and means whereby said withdrawal will cause a flow of steam from the first mentioned dome into the other dome, said flow effecting the upward movement of the steam from said boiler directly into the lower portion of said first mentioned dome in contact with and in countercurrent to the water from said feed water preheater descending in said final feed water heater.

18. A locomotive boiler embodying therein a barrel portion, a dome-shaped member arranged on the upper part of the barrel, said barrel having a comparatively large opening directly communicating with the lower portion of said dome-shaped member and surrounded by the latter, a final feed water heater and sediment collector arranged within the dome-shaped member and having communication with the steam space of the boiler barrel through said barrel opening, in combination with a feed water preheater arranged outside of said final feed water heater dome, and means for conveying heated water from said preheater to the upper portion of said final feed water heater, whereby it may descend through the latter to said barrel portion, said opening permitting the upflow of steam from said barrel portion through said descending water and in contact therewith.

FRITZ WAGNER.